Sept. 7, 1948.  W. G. DARDEN  2,448,867
BICYCLE HANDLE BAR AND SEAT ATTACHMENT
Filed Aug. 9, 1946  2 Sheets-Sheet 1
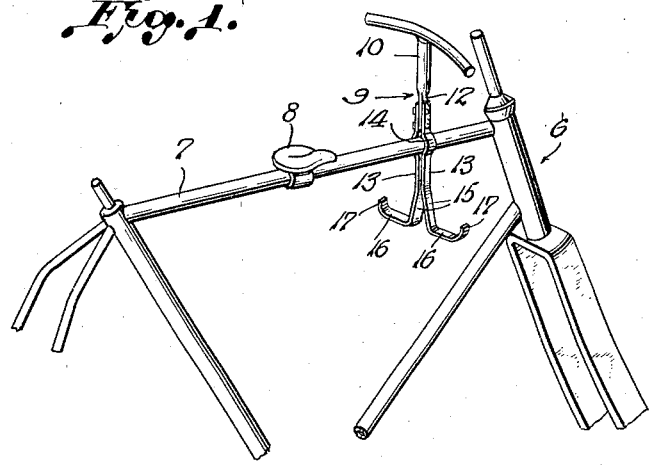
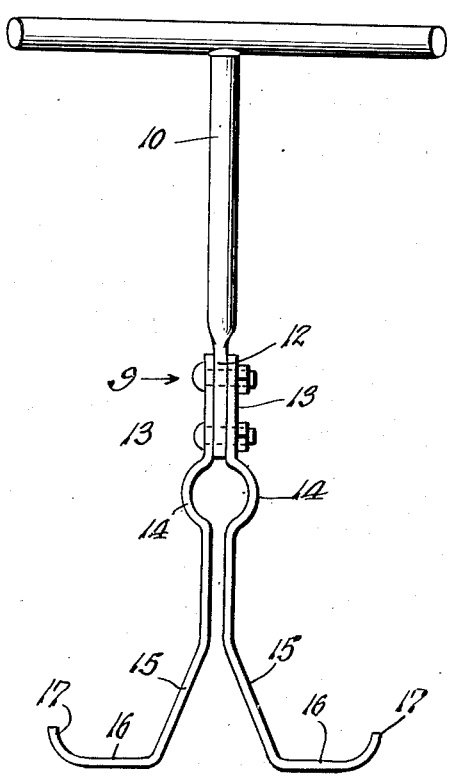
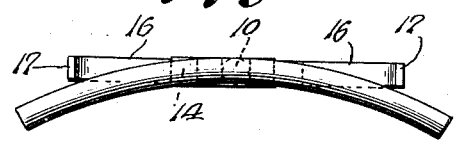
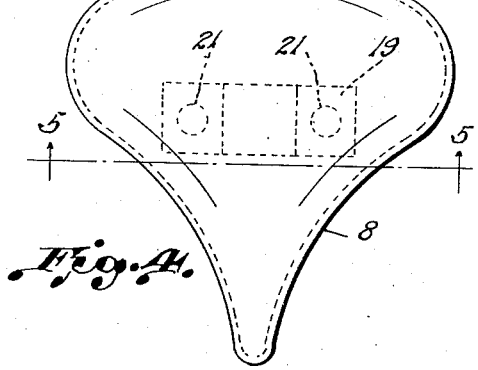
INVENTOR.
Walter G. Darden
BY
Geo. A. Tew
ATTORNEY.

Sept. 7, 1948.   W. G. DARDEN   2,448,867
BICYCLE HANDLE BAR AND SEAT ATTACHMENT
Filed Aug. 9, 1946   2 Sheets-Sheet 2

INVENTOR.
Walter G. Darden
BY
Geo. A. Tew
ATTORNEY.

Patented Sept. 7, 1948

2,448,867

UNITED STATES PATENT OFFICE 2,448,867

BICYCLE HANDLE BAR AND SEAT ATTACHMENT

Walter G. Darden, Houston, Tex.

Application August 9, 1946, Serial No. 689,487

5 Claims. (Cl. 155—5.13)

This invention relates to an attachment for a bicycle, and more particularly to an auxiliary seat, handle bar and foot rest for the accommodation of a small child wherein the child occupies the seat while being taken for a ride by an adult.

The invention is illustrated in the accompanying drawings in which:

Fig. 1 is a perspective view of the frame part of a bicycle showing the auxiliary seat, handle bar and foot rest attachment;

Fig. 2 is a detail view of the foot rest and handle bar;

Fig. 3 is a top plan view looking down on the handle bar and foot rest attachment;

Fig. 4 is a top plan view of the seat;

Figure 6:
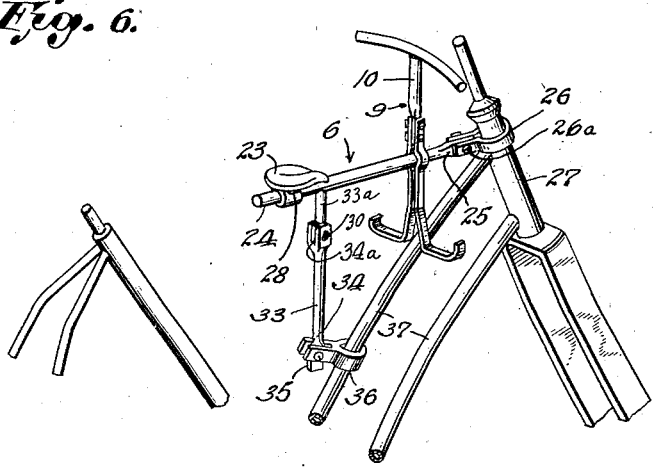
Fig. 6 illustrates a modification, being a view in perspective of the frame part of a girl's bicycle showing the auxiliary seat attachment.
Figure 5:
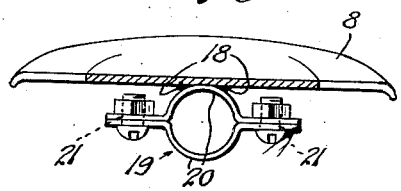
Fig. 5 is a section on the line 5—5 of Fig. 4.
Figure 3A:
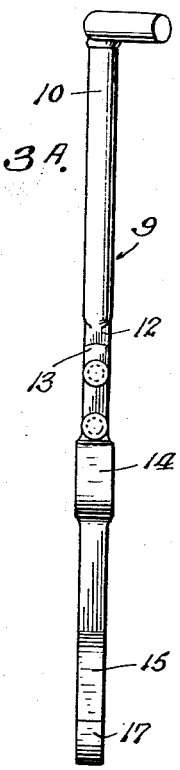
Fig. 3a is a side view in elevation of the handle bar and foot rest.

Referring specifically to the drawings in which like numerals indicate similar parts throughout the several views, a usual bicycle frame work is indicated generally at 6, having the usual upper cross frame 7. To the cross frame 7 is attached the auxiliary seat 8 and auxiliary handle bar and foot rest 9. Referring to Fig. 2, the handle bar section comprises an upwardly extending rod or pipe section 10, which has welded thereto at its upper end a slightly curved handle bar, the handle bar of course being attached at its center part to the rod 10. The rod 10 at its lower end terminates in a solid flattened portion 12 being provided with two spaced holes for the reception of bolts or the like. The lower foot resting portion comprises two identical halves 13 of strap metal which are drilled at their upper ends with two spaced holes to register with the holes in the member 12 when the elements are assembled. The metal straps 13 are each provided with oppositely outwardly curved or bulged portions 14, substantially the diameter of the cross frame 7 over which these portions fit. The metal straps are slightly flared as indicated at 15 and then extend horizontally outwardly to form a flat foot rest 16, terminating in upwardly curved guard members 17.

The auxiliary seat comprises a seat part 8 which is welded as at 18 to the upper half of a clamping device 19 comprising two identical halves 20, the halves being oppositely bulged to engage the cross frame 7, each half being provided with holes 21 for the reception of bolts or the like to hold the seat fast on the cross frame.

Figure 7:
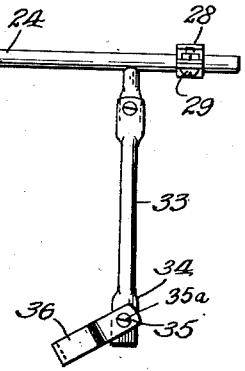
Fig. 7 is a detail view of the seat and handle bar supporting frame.

In the modification illustrated in Figs. 6 and 7, the auxiliary attachment comprises a handle bar and foot rest identical with that heretofore described. However, for supporting the seat 23 there is provided a horizontal rod 24 having a flattened end 25 which is attached to a collar 26 as by a known bolt and nut connection 26a, said collar embracing the neck portion 27 of a bicycle. The seat 23 is slid onto the end of the horizontal rod 24 and clamped in place as by clamping member 28 and bolts 29. The horizontal rod 24 has welded near its end a downwardly extending stud rod 33a having a flattened portion 34a. A rod 33 terminates at its upper end in forked members 30 which engage the flattened portion 34a as by a pivot pin 31, the rod 33 terminating at its lower end in a flattened portion 34 which end receives at its opposite sides the end members 35 of a collar 36 being attached thereto by a bolt and nut connection 35a, this collar embracing the downwardly extending frame member 37 of a girl's bicycle. Thus the rod 33 is pivoted as at the pivot pin 31 for horizontal adjustment.

It will readily be seen that such an arrangement provides for adjustment of the auxiliary seat and handle bar support whereby the same will fit various and different sized bicycles.

In both forms the attachment is cheap in cost of construction and can be readily removed and attached to any bicycle.

The invention is not intended to be limited to the exact construction shown, but is capable of modification within the scope of the following claims.

I claim:

1. A bicycle attachment comprising a seat mounted on the cross frame bar of said bicycle, a handle bar and foot rest construction attached to the cross frame bar of a bicycle, said handle bar being horizontal and having a downwardly extending bar with a flattened end, the foot rest consisting of strap members attached to the flattened end of said bar and having oppositely bulged portions in engagement with the bicycle frame, and terminating at their lower ends in horizontal foot rests.

2. A bicycle attachment comprising a seat mounted on the cross frame bar of said bicycle, a handle bar and foot rest construction attached to the cross frame bar of a bicycle, said handle bar being horizontal and having a downwardly extending bar with a flattened end, the foot rest consisting of strap members attached to the flattened end of said bar and having oppositely bulged portions in engagement with the bicycle frame, said strap members terminating adjacent their lower ends in outwardly flared portions and in horizontal foot rests.

3. A bicycle attachment comprising a seat mounted on the cross frame bar of said bicycle, a handle bar and foot rest construction attached to the cross frame bar of a bicycle, said handle bar being horizontal and having a downwardly extending bar with a flattened end, the foot rest consisting of strap members attached to the flattened end of said bar and having oppositely bulged portions in engagement with the bicycle frame, said strap members terminating adjacent their lower ends in outwardly flared portions and in horizontal foot rests, said rests being flared upwardly at their outer ends.

4. A bicycle attachment comprising a seat mounted on the cross frame bar of said bicycle, a handle bar and foot rest construction attached to the cross frame bar of a bicycle, said handle bar being horizontal and having a downwardly extending bar with a flattened end, the foot rest consisting of strap members attached to the flattened end of said bar and having oppositely bulged portions in engagement with the bicycle frame and terminating at their lower ends in horizontal foot rests, said seat welded to the upper part of a split bracket attached to the bicycle cross frame bar.

5. A bicycle attachment comprising a horizontal rod, a clamping collar at one end, a downwardly extending stud rod atached to the horizontal rod, a rod adjustably attached to the stud rod at one end and to a frame engaging collar at the other end, a seat attached to the horizontal rod, a handle bar and foot rest construction mounted on said horizontal bar.

WALTER G. DARDEN.

REFERENCES CITED

The following references are of record in the file of this patent:

UNITED STATES PATENTS

| Number | Name | Date |
|---|---|---|
| 1,013,007 | Fowler | Dec. 26, 1911 |
| 2,320,344 | Belanger | June 1, 1943 |

FOREIGN PATENTS

| Number | Country | Date |
|---|---|---|
| 212,192 | Great Britain | 1924 |
| 416,359 | France | 1910 |